United States Patent
Lee

(10) Patent No.: US 9,658,332 B2
(45) Date of Patent: May 23, 2017

(54) SENSOR FOR VEHICLE AND VEHICLE INCLUDING THE SAME

(71) Applicant: HYUNDAI MOBIS Co., Ltd., Yongin-si, Gyeonggi-do (KR)

(72) Inventor: Dong Wook Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 189 days.

(21) Appl. No.: 14/645,478

(22) Filed: Mar. 12, 2015

(65) Prior Publication Data

US 2016/0154095 A1 Jun. 2, 2016

(30) Foreign Application Priority Data

Dec. 2, 2014 (KR) .......................... 10-2014-0170748

(51) Int. Cl.
*G01S 15/93* (2006.01)
*G01S 15/87* (2006.01)

(52) U.S. Cl.
CPC ............. *G01S 15/931* (2013.01); *G01S 15/87* (2013.01); *G01S 2015/932* (2013.01)

(58) Field of Classification Search
CPC ........ G01S 15/931; G01S 15/87; H04B 11/00
See application file for complete search history.

(56) References Cited

U.S. PATENT DOCUMENTS

| | | | | |
|---|---|---|---|---|
| 3,944,984 A * | 3/1976 | Morley | ................ | G05B 19/056 700/17 |
| 5,355,322 A * | 10/1994 | Yamashita | .......... | G06F 17/5077 716/130 |
| 6,487,620 B1 * | 11/2002 | Grosshog | ............ | G06F 13/4291 710/105 |
| 6,538,472 B1 * | 3/2003 | McGee | ............ | H03K 19/01825 326/82 |

(Continued)

FOREIGN PATENT DOCUMENTS

| KR | 10-2003-0022130 A | 3/2003 |
|---|---|---|
| KR | 10-2014-0030689 A | 3/2014 |
| KR | 10-2014-0121117 A | 10/2014 |

OTHER PUBLICATIONS

Oct. 20, 2016, Korean Notice of Allowance for related KR application No. 10-2014-0170748.

*Primary Examiner* — Helen Kwok
(74) *Attorney, Agent, or Firm* — Paratus Law Group, PLLC

(57) ABSTRACT

A sensor for a vehicle according to an exemplary embodiment of the present invention includes: a processor including first to sixth pins; first to third input pins connected with a connector; and an exchange circuit including first to third pins connected with the processor and the first to third input pins, and fourth to sixth pins connected with the processor, and a vehicle according to another exemplary embodiment of the present invention includes: a plurality of sensors for a vehicle, each of which includes: a processor including first (Continued)

to sixth pins; first to third input pins connected with a connector; and an exchange circuit including first to third pins connected with the processor and the first to third input pins, and fourth to sixth pins connected with the processor; and an electronic control unit (ECU) connected with the plurality of sensors for a vehicle by a bus topology method.

14 Claims, 5 Drawing Sheets

(56) References Cited

U.S. PATENT DOCUMENTS

| | | | | |
|---|---|---|---|---|
| 6,541,878 | B1* | 4/2003 | Diab | H01F 27/40 307/17 |
| 7,603,493 | B2* | 10/2009 | Johnson | G11C 7/1027 365/189.05 |
| 2004/0145036 | A1* | 7/2004 | Muff | H01L 23/66 257/666 |
| 2009/0112494 | A1* | 4/2009 | Kagan | G01D 4/004 702/62 |
| 2009/0267797 | A1* | 10/2009 | Kim | G01S 15/931 340/932.2 |
| 2014/0047152 | A1* | 2/2014 | Peters | A01B 59/00 710/305 |
| 2015/0070003 | A1* | 3/2015 | Elliott | B60T 8/368 324/207.15 |
| 2015/0168550 | A1* | 6/2015 | Kim | G01S 15/931 367/135 |
| 2016/0094261 | A1* | 3/2016 | Yildirim | H04B 1/3888 455/90.1 |

\* cited by examiner

| ADR0 | ADR1 | ADR2 | NAD |
|---|---|---|---|
| Short | Short | Short | A |
| Short | Short | Open | B |
| Short | Open | Short | C |
| Short | Open | Open | D |
| Open | Short | Short | E |
| Open | Short | Open | F |

| X | Y | Z | NAD |
|---|---|---|---|
| Vsup | LIN | GND | A |
| Vsup | GND | LIN | B |
| GND | Vsup | LIN | C |
| GND | LIN | Vsup | D |
| LIN | GND | Vsup | E |
| LIN | Vsup | GND | F |

FIG. 8
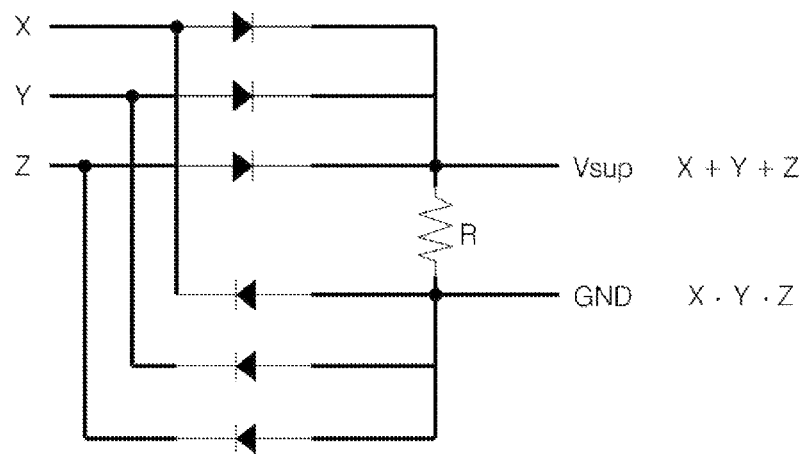
FIG. 9
FIG. 10
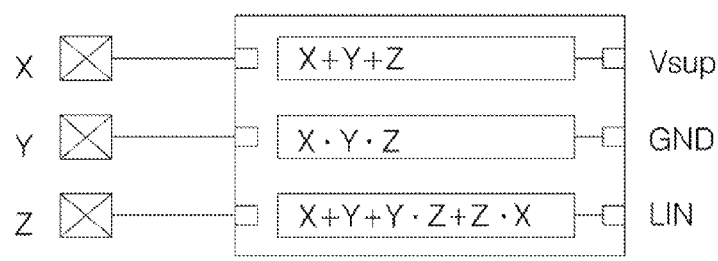

SENSOR FOR VEHICLE AND VEHICLE INCLUDING THE SAME

CROSS-REFERENCE TO RELATED APPLICATIONS

The present application claims priority to Korean Patent Application Number 10-2014-0170748 filed Dec. 2, 2014, the entire contents of which the application is incorporated herein for all purposes by this reference.

TECHNICAL FIELD

The present invention relates to a sensor for a vehicle and a vehicle including the same, and more particularly, to a sensor for a vehicle, such as an ultrasonic sensor, including an interface connectable with a heterogeneous connector, a vehicle including the same, and an operating method thereof.

BACKGROUND

A vehicle including a parking assisting apparatus has increased. The parking assisting apparatus is an apparatus for detecting an obstacle, and notifying a driver of an interval with a vehicle or automatically parking the vehicle based on the detected obstacle while parking, and may include an ultrasonic sensor for detecting an obstacle.

The parking assisting apparatus for detecting an obstacle around a vehicle through an ultrasonic sensor and giving an alarm to a driver is generally divided into two methods as illustrated in FIGS. 1 and 2 according to a connection method between an electronic control unit (ECU) and a sensor.

FIG. 1 is a diagram illustrating an example of an interface, in which an ECU of a vehicle communicates one to one with each ultrasonic sensor, and a three-pin connector method in the related art, and FIG. 2 is a diagram illustrating an example of an interface, in which an ECU of a vehicle communicates one to N with each ultrasonic sensor, and a six-pin connector method in the related art.

Referring to FIG. 1, the method of communicating one to one between the ECU 100 and respective ultrasonic sensors 201, 202, 203, 204, . . . adopts a star topology connection structure, and the respective sensors are connected to a three-pin connector.

Referring to FIG. 2, the method of communicating one to N between the ECU 100 and respective ultrasonic sensors 201, 202, 203, 204, . . . adopts a bus topology connection structure, and the respective sensors are connected to a six-pin connector.

Input signals of each pin of the connectors 210 and 220 are power Vsup, ground GND, a signal Signal or LIN, and the like, which are illustrated in FIGS. 1 and 2.

The reason why use the six-pin connector in the bus topology method is used because the ECU 100 requires an address of each sensor in order to discriminate the same ultrasonic sensors on the bus, but the address of the sensor is assigned based on an open state and a short state of three address pins ADR0 to ADR2, so that three pins are additionally required.

The bus topology method has a relative advantage in that a length of a line and the number of pins of the ECU necessary for a connection are decreased, and communication is more reliable while using a standard protocol.

However, there are many cases where the parking assistance apparatus currently adopts the star topology and the three-pin connector method, so that research on a method of minimizing an increase in manufacturing costs and a change in design, and using the bus topology method has been conducted.

SUMMARY

The present invention has been made in an effort to provide a sensor for a vehicle, such as an ultrasonic sensor, including an interface connectable with a heterogeneous connector, and a vehicle including the same.

The present invention has also been made in an effort to provide a sensor for a vehicle, such as an ultrasonic sensor, including an interface connectable with a three-pin connector while maintaining a bus topology method, and a vehicle including the same.

Objects of the present invention are not limited to the objects described above, and other objects that are not described will be clearly understood by a person skilled in the art from the description below.

An exemplary embodiment of the present invention provides a sensor for a vehicle, including: a processor including first to sixth pins; first to third input pins connected with a connector; and an exchange circuit including first to third pins connected with the processor and the first to third input pins, and fourth to sixth pins connected with the processor.

Another exemplary embodiment of the present invention provides a vehicle, including: a plurality of sensors for a vehicle, each of which includes: a processor including first to sixth pins; first to third input pins connected with a connector; and an exchange circuit including first to third pins connected with the processor and the first to third input pins, and fourth to sixth pins connected with the processor; and an electronic control unit (ECU) connected with the plurality of sensors for a vehicle by a bus topology method.

According to the exemplary embodiments of the present invention, the sensor for a vehicle and the vehicle including the same may be connected through a heterogeneous connector and connected with a three-pin connector while maintaining the bus topology method, so that it is possible to decrease a length of a line and the number of pins of the ECU required to form the connection, and establish more reliable communication using the standard protocol.

The effects of the present invention are not limited to the aforementioned effects, and other effects, which are not mentioned above, will be clearly understood by those skilled in the art from the claims.

BRIEF DESCRIPTION OF THE DRAWINGS

FIG. 6 is a diagram illustrating an example of a six-pin ultrasonic sensor according to an exemplary embodiment of the present invention.

FIGS. 7 to 10 are diagrams referred to describe setting of an address of the ultrasonic sensor of FIG. 6.

DETAILED DESCRIPTION

Figure 1:
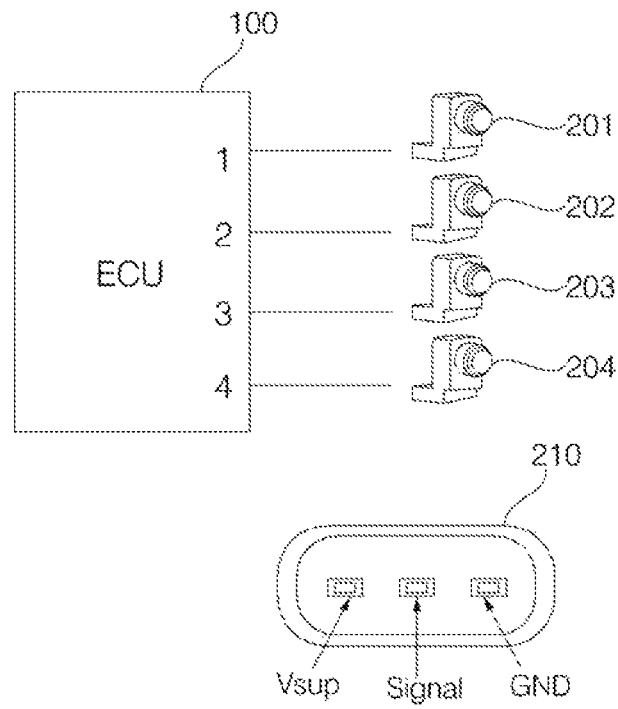
FIG. 1 is a diagram illustrating an example of an interface, in which an ECU of a vehicle communicates one to one with each ultrasonic sensor, and a three-pin connector method in the related art.
Figure 2:
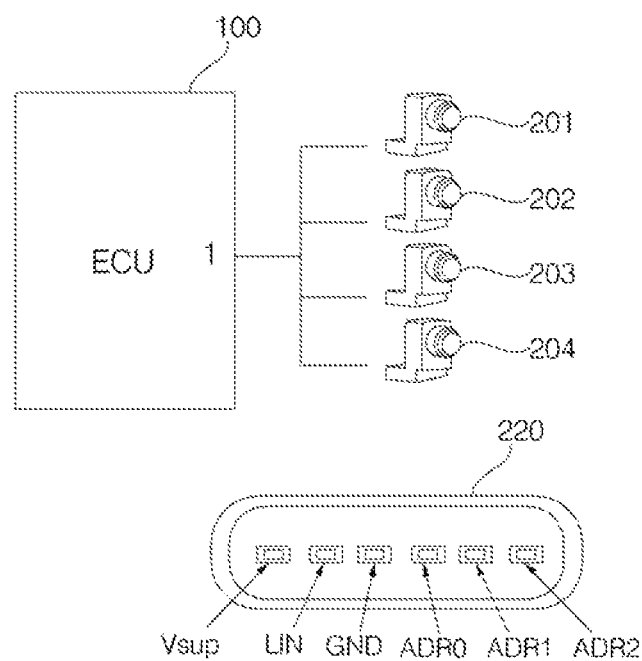
FIG. 2 is a diagram illustrating an example of an interface, in which an ECU of a vehicle communicates one to N with each ultrasonic sensor, and a six-pin connector method in the related art.

Hereinafter, the present invention will be described in more detail with reference to the drawings. The accompanying drawings are for the purpose of easily describing the exemplary embodiment disclosed in the present specification, and the technical spirit disclosed in the present specification is not limited by the accompanying drawings, and it should be appreciated that the present invention includes all of the changes, equivalents, and replacements included in the spirit and the technical scope of the present invention. The same or similar constituent element is denoted by the same reference numeral regardless of a reference numeral, and an overlapping description thereof will be omitted.

Suffixes of a "module" and a "unit" for components used in the following description are given by considering only easiness in preparing a specification and do not have an especially important meaning or role themselves. Accordingly, the suffixes of a "module" and a "unit" may be mixed and used.

Terms including an ordinal number, such as first and second, are used for describing various constituent elements, but the constituent elements are not limited by the terms. The terms are used only to discriminate one constituent element from another constituent element.

It should be understood that when one constituent element is referred to as being "coupled to" or "connected to" another constituent element, the constituent element can be directly coupled to or connected to the other constituent element, but intervening elements may also be present therebetween. In contrast, when one constituent element is "directly coupled to" or "directly connected to" another constituent element, it should be understood that there is no intervening element therebetween.

The singular forms include the plural forms, unless the context clearly indicates otherwise.

In the present invention, it should be understood that the term "include" or "have" indicates that a feature, a number, a step, an operation, a component, a part or a combination thereof described in the specification is present, but does not exclude a possibility of presence or addition of one or more other features, numbers, steps, operations, components, parts or combinations thereof, in advance.

Figures 3, 4:
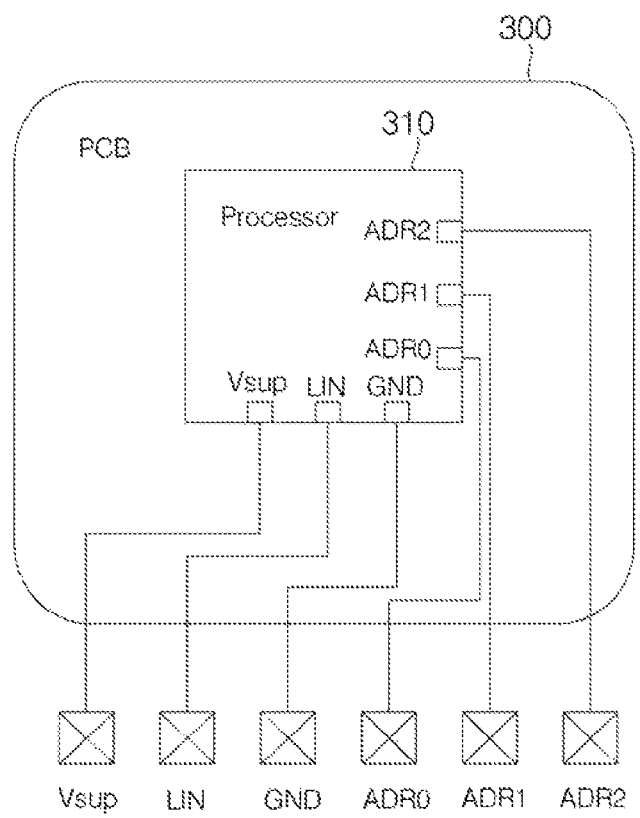
FIG. 3 is a diagram illustrating an example of a six-pin ultrasonic sensor in the related art.
FIG. 4 is a diagram referred to describe setting of an address of the ultrasonic sensor of FIG. 3.

FIG. 3 is a diagram illustrating an example of a six-pin ultrasonic sensor in the related art, and FIG. 4 is a diagram referred to describe setting of an address of the ultrasonic sensor of FIG. 3.

Referring to FIG. 3, a processor 310, which is capable of driving a transducer serving to transceive ultrasonic waves in a digital type ultrasonic sensor 300 and controlling a general operation of the ultrasonic sensor 300, is embedded in a printed circuit board (hereinafter, a PCB) inside the ultrasonic sensor 300.

The existing six-pin sensor 300 includes a power supply input Vsupply (hereinafter, Vsup) for supplying power, a local interconnect network (LIN) signal for transmitting a communication signal to an electronic control unit (ECU), a ground (GND) input that is a ground signal, and three address (ADR) pin inputs for discriminating the respective sensors.

In the meantime, respective pins Vsup, LIN, GND, ADR0, ADR1, and ADR2 of an external connector are connected to the corresponding pins Vsup, LIN, GND, ADR0, ADR1, and ADR2 of the processor 310 on the PCB.

Referring to a table of FIG. 4, a node address (NAD) of each sensor may be designated according to whether the three address pins ADR0, ADR1, and ADR2 are short-circuited or opened. In this case, up to eight addresses may be designated in one bus channel by the six-pin method.

Figure 5:
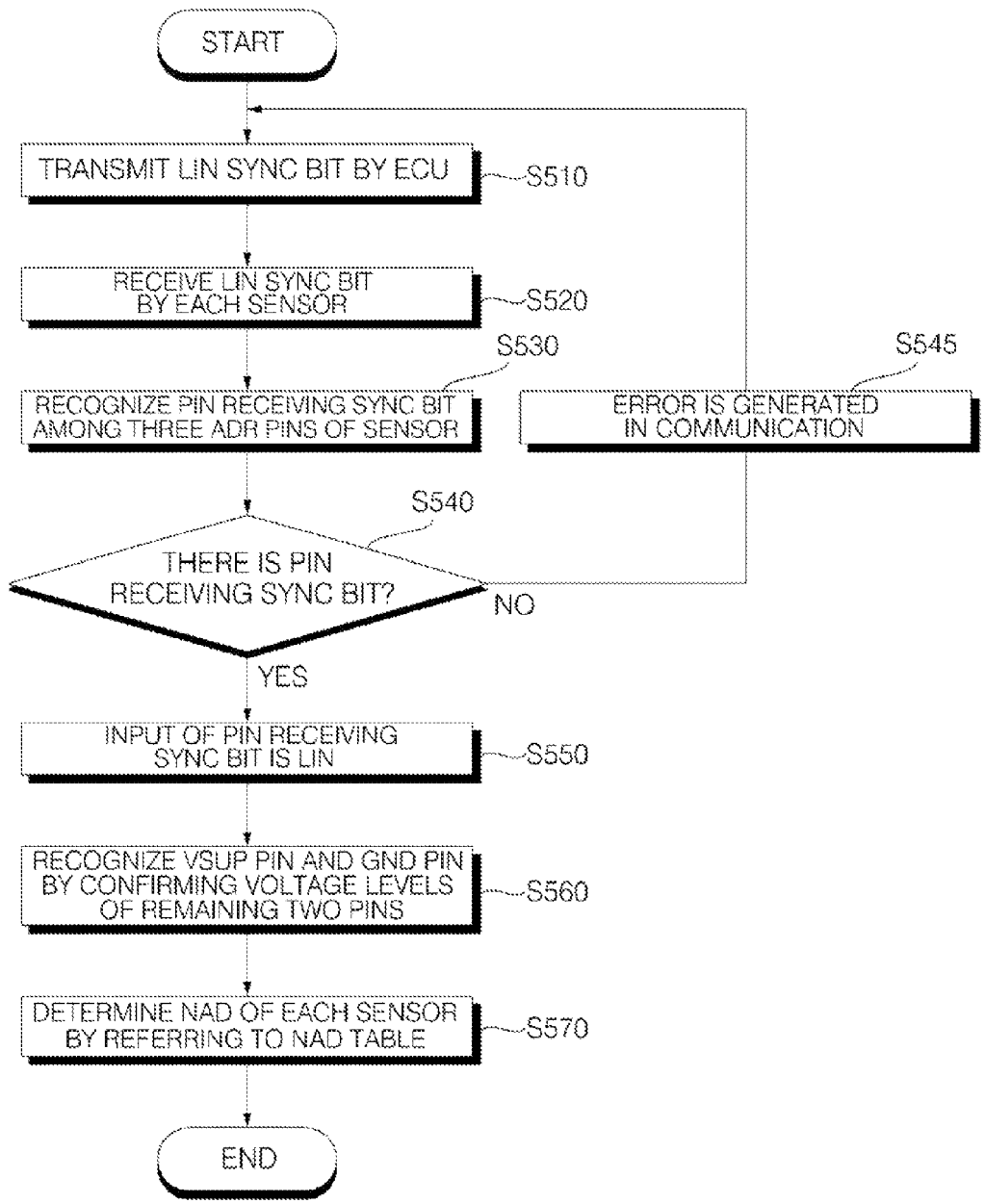
FIG. 5 is a diagram referred to describe an operation method of an ECU and a sensor for a vehicle according to an exemplary embodiment of the present invention.
Figures 6, 7:
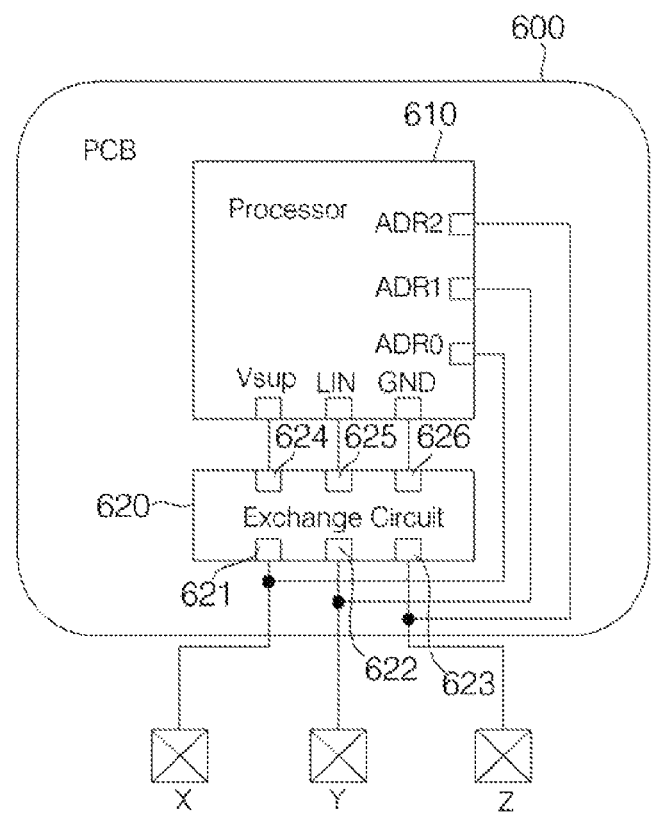

FIG. 5 is a diagram referred to describe an operation method of an ECU and a sensor for a vehicle according to an exemplary embodiment of the present invention, and FIG. 6 is a diagram illustrating an example of a six-pin ultrasonic sensor according to an exemplary embodiment of the present invention.

The ECU and a sensor for a vehicle according to an exemplary embodiment of the present invention may transceive data by LIN communication.

Accordingly, the sensor for a vehicle may be a sensor capable of establishing LIN communication with the ECU through the LIN bus. For example, the sensor for a vehicle may be a battery sensor and the like for detecting a state of a battery providing power to a vehicle.

Particularly, the sensor for a vehicle may be an ultrasonic sensor for transceiving data with the vehicle through the LIN communication, and the vehicle may include a plurality of ultrasonic sensors.

Hereinafter, the sensor for a vehicle will be described based on the ultrasonic sensor.

Referring to FIGS. 5 and 6, when the LIN communication starts, the ECU may transmit a LIN sync bit (S510), and each ultrasonic sensor may receive the LIN sync bit (S520).

In the meantime, a sensor 600 for a vehicle according to an exemplary embodiment of the present invention may include a processor 610 including first to sixth pins, first to third input pins X, Y, and Z connected with a connector, and an exchange circuit 620 including first to third pins 621, 622, and 623 connected with the processor 610 and the first to third input pins X, Y, and Z, and fourth to sixth pins 624, 625, and 626 connected with the processor 610.

A vehicle according to the exemplary embodiment of the present invention may include a plurality of sensors 600 for a vehicle according to the exemplary embodiment of the present invention.

That is, the vehicle according to the exemplary embodiment of the present invention may include the plurality of sensors for a vehicle, each of which includes the processor including the first to sixth pins, the first to third input pins connected with the connector, and the exchange circuit including the first to third pins connected with the processor and the first to third input pins and the fourth to sixth pins connected with the processor, and the ECU connected with the plurality of sensors for a vehicle by a bus topology method.

Referring to FIG. 6, in the meantime, the first to third pins 621, 622, and 623 of the exchange circuit 620 may be connected with first to third pins ADR0, ADR1, and ADR2 of the processor 610, and the first to third input pins X, Y, and Z may also be connected with the first to third pins ADR0, ADR1, and ADR2 of the processor 610.

The fourth to sixth pins 624, 625, and 626 of the exchange circuit 620 may be connected with fourth to sixth pins of the processor 610.

In the meantime, the fourth to sixth pins of the processor 610 may be a power supply Vsup pin, an LIN pin, and a ground GND pin.

Referring to FIG. 6, in contrast to the ultrasonic sensor 300 exemplified in FIG. 3, the sensor 600 for compatibility of the three-pin connector according to the exemplary embodiment of the present invention includes three input pins, that is, the power supply Vsup pin, the LIN pin, and the ground GND pin, when viewed from the outside, and additionally includes the exchange circuit 620 for the three input pins X, Y, and Z, instead of three address pins ADR PIN.

The exchange circuit 620 serves to change the existing six-pin sensor to be connected to the three-pin connector, and transmit an output corresponding to the power supply Vsup pin, the LIN pin, the ground GND pin of the processor 610 from three pin inputs, of which an order is not set, for designating an address.

The existing six-pin sensor may designate an address of each sensor on the bus based on the three address pins ADR0, ADR1, and ADR2, but the three-pin connector compatible sensor that is the present invention may designate an address of each sensor by changing an arrangement of the pins of the connector.

An address of each sensor is inevitably designated by using only three pins for driving the sensor, not a separate address designating pin, so that an address is designated only by changing a pin arrangement order. Accordingly, an actual arrangement of the input pins X, Y, and Z of each sensor may not be recognized until each sensor is connected to the connector and starts an operation.

Accordingly, a process of recognizing inputs, to which the X, Y, and Z pins actually correspond, and assigning an address of each sensor through an address designating table for a pin arrangement is required.

FIGS. 7 to 10 are diagrams referred to describe setting of an address of the ultrasonic sensor of FIG. 6.

In the six-pin sensor method described with reference to FIG. 4, a node address (NAD) of each sensor is designated according to whether the address pins ADR0, ADR1, and ADR2 are short-circuited or opened.

According to the present invention, an address of the sensor may be set according to functions and an arrangement order of the first to third input pins X, Y, and Z.

Referring to a table of FIG. 7, it can be seen that an address of each sensor is designated according to an arrangement of the respective pins in a three-pin compatible method table according to the present invention. In this case, up to eight addresses may be designated in one bus channel by the six-pin method, but up to six addresses may be designated due to a limit of the number of pins in the three-pin compatible method. In the meantime, the address needs to be designated because each sensor is produced with the same product number, and the ECU for transmitting a command to the sensor has to give different commands to the plurality of same sensors connected onto one bus, so that an intrinsic address ID is allocated by dividing the sensors through a wiring difference of the connector.

Referring to the table of FIG. 7, an address of the sensor, in which the input pin X corresponds to the power supply Vsup pin, the input pin Y corresponds to the LIN pin, and the input pin Z corresponds to the ground GND pin, may be set to "A".

When an address designating method using the pin arrangement is used, a pin arrangement of the connector is not fixed, so that there is a problem in that it is impossible to recognize which one among the input pins X, Y, and Z corresponds to the power supply Vsup and the ground GND.

However, in order to drive the sensor, power needs to be essentially supplied to the processor 610 in advance. In order to solve the requirement, the three inputs including the power supply require a circuit, which is capable of essentially outputting a power output signal, regardless of the input corresponding to the power supply, and the ground signal also requires a circuit similar to the inputs.

Accordingly, it is not known which input pin corresponds to the power supply, so that the circuit needs not to have a bias voltage or needs to be configured by a power feedback circuit.

The circuit may be configured by using a logic diode circuit illustrated in FIG. 8, and may be included in the exchange circuit 620.

As illustrated in FIG. 8, since a signal corresponding to the LIN pin is a digital signal having a voltage range of 0 to Vsup, a desired output may be generated by using a logic circuit, in which Vsup corresponds to high voltage and 0 V corresponds to low voltage. For the power supply Vsup, one of the inputs is power corresponding to high voltage, so that the one input may be implemented by an OR logic similar to a circuit diagram, and for the ground GND, one of the inputs is ground corresponding to low voltage, so that the one input may be implemented by an AND logic.

A logic circuit capable of selecting a signal corresponding to the LIN is required. An input/output characteristic of a corresponding logic circuit is that one input has the same value as that of the output regardless of values of the other two inputs among the three inputs as can be seen in a LIN output logic diagram of FIG. 9. The LIN is a communication bus, through which data is actually transmitted, and has a continuously varied value unlike the power supply or the ground pin, so that all of the input states of the LIN are illustrated. When a logic diagram is configured by converting the LIN output logic diagram into the Karnaugh map as illustrated in the drawing of on the right of FIG. 9, it can be seen that a logic formula corresponding to the LIN is X×Y+Y×Z+Z×X.

Through the logic formula, a no-power circuit which outputs the power Vsup signal, the ground GND signal, and the LIN signal regardless of the arrangement of the X, Y, and Z input pins as illustrated in FIG. 10 may be configured. FIG. 10 is a block diagram of the exchange circuit 620.

To organize the configuration of the logic circuit for the X, Y, and Z input pins, the logic formula of an input signal corresponding to the output of the Vsup pin is X+Y+Z, the logic formula of an input signal corresponding to the output of the GND pin is X×Y×Z, and the logic formula of an input signal corresponding to the output of the LIN pin is X×Y+Y×Z+Z×X.

In FIG. 8, the circuit is configured by using only the diode, but a corresponding logic formula may also be implemented by combining the diode and another transistor. The circuit is the exchange circuit 620 for converting the non-fixed X, Y, and Z inputs into the Vsup, the GND, and the LIN, and the input pin of the processor 610 inside the sensor driving the ultrasonic sensor 600 may be connected with a corresponding output.

In the meantime, the X, Y, and Z pins may be connected to the address pins ADR0, ADR1, and ADR2 of the processor 610, which are not used in the three-pin compatible method, respectively. Since the address pins ADR0, ADR1, and ADR2 of the processor 610 are general I/O pins, the address pins ADR0, ADR1, and ADR2 of the processor 610 may receive a signal of a power Vsup voltage level as an input.

The sensor according to the present invention may determine signal levels of the first to third pins, that is, the address pins ADR0, ADR1, and ADR2, of the processor 610, and identify the first to third input pins, that is, the X, Y, and Z pins.

The power has been supplied to the processor 610 through the exchange circuit 620 and the LIN communication is in an available state, so that the processor 610 may read the signal levels of the address pins ADR0, ADR1, and ADR2 and discriminate the input of each of the X, Y, and Z pins.

The LIN pin requires a process of transmitting a LIN sync bit (the predetermined number of pulses) by the ECU in order to be discriminated from other pins. Each sensor may discriminate the LIN pin through an interrupt processing for the sync signal.

The power supply Vsup pin is a pin, in which a high state is maintained, and the ground GND pin is a pin, in which a low state is maintained.

Accordingly, the sensor 600 may recognize whether there is a pin receiving a bit from the ECU of the vehicle among the first to third pins ADR0, ADR1, and ADR2 of the processor (S540), and when there is the pin receiving the bit from the ECU (S550), the sensor 600 may determine the pin receiving the bit from the ECU of the vehicle among the first to third pins ADR0, ADR1, and ADR2 of the processor as the LIN pin (S560).

In the meantime, when there is no pin receiving the bit from the ECU, the sensor 600 determines that an error is generated in the LIN communication (S545), and needs to receive the sync bit again.

The sensor may determine a pin in the high state as the power supply Vsup pin, and determine a pin in the low state as the ground GND pin by reading the signal levels of the first to third pins of the processor (S560).

In the meantime, the LIN pin has the high or low state, so that the discrimination of the LIN pin needs to be first performed before the power supply Vsup pin and the ground GND pin.

In the meantime, the process may be performed after the voltage level is stabilized after the start of the system.

Then, when the roles of the X, Y, and Z pins are divided, the sensor may autonomously assign an address of a corresponding sensor by referring to the "three-pin compatible method NAD table" exemplified in FIG. 7.

Accordingly, the address of the sensor may be set by comparing the identified first to third input pins X, Y, and Z with a predetermined address designating table (S570).

According to the present invention, the sensor for a vehicle and the vehicle including the same may be connected through a heterogeneous connector and connected with the three-pin connector while maintaining the bus topology method, so that it is possible to decrease a length of a line and the number of pins of the ECU required to the connection, and establish more reliable communication than communication using the standard protocol.

The present invention may enable the three-pin connector, which is used for connecting the ultrasonic sensor in the parking assisting system using the start topology connection method between the ECU of the vehicle and the sensors, particularly, the ECU of the vehicle and the respective ultrasonic sensors, to be used in the bus topology connection method currently using the six-pin connector as it is.

To this end, the existing six-pin sensor in the bus topology method may be changed to have the three-pin sensor structure, and the bus topology connection method may be used as it is so as to maintain an advantage of the bus-based network system.

Accordingly, according to the present invention, the sensors having different connector interfaces may be compatible.

According to the present invention, it is possible to decrease the number of pins of the connector of the ECU and a length of the connection line.

In the meantime, the sensor for a vehicle and the operating method of the vehicle according to the present invention may be implemented by a processor readable code in a recording medium readable by a processor included in the sensor for a vehicle and/or the vehicle. The processor readable recording medium includes every type of recording device in which data readable by a processor is stored. Examples of the processor readable recording medium are ROM, RAM, CD-ROM, a magnetic tape, a floppy disk, an optical data storing device and also implemented as a carrier wave (for example, transmission through the Internet). Further, the processor readable recording medium is distributed to computer systems connected through a network, so that a processor readable code may be stored and executed by a distribution method.

In the meantime, Even if it is described that all of the constituent elements constituting the aforementioned exemplary embodiment of the present invention are coupled as a single unit or coupled to be operated as a single unit, the present invention is not necessarily limited to the exemplary embodiment. That is, one or more of all constituent elements may be selectively coupled to be operated within the scope of the object of the present invention.

All terms used herein including technical or scientific terms have the same meanings as meanings which are generally understood by those skilled in the art unless they are differently defined in the detailed description. Terms used in generally, such as terms defined in a dictionary, shall be construed that they have meanings matching those in the context of a related art, and shall not be construed in ideal or excessively formal meanings unless they are clearly defined in the present invention.

Although an exemplary embodiment of the present invention has been described for illustrative purposes, those skilled in the art will appreciate that various modifications, changes and substitutions are possible, without departing from the scope and spirit of the invention. Therefore, the embodiments disclosed in the present invention and the accompanying drawings are not intended to limit but illustrate the technical spirit of the present invention, and the scope of the present invention is not limited by the embodiment and the accompanying drawings. The protection scope of the present invention shall be construed on the basis of the accompanying claims and it shall be construed that all of the technical ideas included within the scope equivalent to the claims belong to the present invention.

What is claimed is:

1. A sensor for a vehicle, comprising:
   a processor including a power supply pin, a local interconnect network (LIN) pin, a ground pin, and first to three address pins;
   first to third input pins configured to be connected with a connector electrically connected with an electronic control unit (ECU) of the vehicle, and configured to receive a power signal, a ground signal, and a local Interconnect network (LIN) signal through the connector; and
   an exchange circuit including first to third pins connected with the first to third input pins, fourth to sixth pins connected with the first to three address pins of the processor, and a logic circuit provided between the first to third pins and the fourth to sixth pins, wherein the first to third input pins are connected with the first to third pins of the exchange circuit and the first to three address pins of the processor, and are configured to deliver the power signal, the ground signal, and the LIN signal to the first to third pins of the exchange circuit and the first to three address pins of the processor, wherein the logic circuit is configured to deliver the power signal, the LIN signal, and the ground signal received from the connector through the first to third pins of the exchange circuit to the power supply pin, the LIN pin, and the ground pin of the processor, respectively, through the fourth to sixth pins of the exchange circuit.

2. The sensor of claim 1, wherein the processor is configured to identify each of the power signal, the ground signal, and the LIN signal received through the first to third input pins by determining signal levels delivered to the first to third address pins of the processor.

3. The sensor of claim 2, wherein the processor is configured to identify a pin receiving a bit from the ECU of the vehicle among the first to third address pins of the processor as a pin which receives the LIN signal.

4. The sensor of claim 2, wherein the processor is configured to identify a pin in a high state among the first to third address pins of the processor as a pin which receives the power signal, and a pin in a low state among the first to third address pins of the processor as a pin which receives the ground signal, by reading the signal levels delivered to the first to third address pins of the processor.

5. The sensor of claim 2, wherein the processor is configured to set an address of the sensor by comparing the identified each of the power signal, the ground signal, and the LIN signal received through the first to third input pins and a predetermined address designating table.

6. The sensor of claim 1, wherein the processor is configured to set an address of the sensor based on the power signal, the ground signal, and the LIN signal delivered to the first to third address pins of the processor through the first to third input pins.

7. The sensor of claim 1, wherein the sensor for the vehicle is an ultrasonic sensor for transceiving data with the vehicle through LIN communication.

8. A vehicle, comprising:
a plurality of sensors for the vehicle, each of which includes: a processor including a power supply pin, a local interconnect network (LIN) pin, a ground pin, and first to three address pins; first to third input pins configured to be connected with a connector, and configured to receive a power signal, a ground signal, and a local Interconnect network (LIN) signal through the connector; and an exchange circuit including first to third pins connected with the first to third input pins, fourth to sixth pins connected with the first to three address pins of the processor, and a logic circuit provided between the first to third pins and the fourth to sixth pins; and an electronic control unit (ECU) connected with each of the plurality of sensors, through the connector, by a bus topology method, wherein the first to third input pins are connected with the first to third pins of the exchange circuit and the first to three address pins of the processor, and are configured to deliver the power signal, the ground signal, and the LIN signal to the first to third pins of the exchange circuit and the first to three address pins of the processor, wherein the logic circuit is configured to deliver the power signal, the LIN signal, and the ground signal received from the connector through the first to third pins of the exchange circuit to the power supply pin, the LIN pin, and the ground pin of the processor, respectively, through the fourth to sixth pins of the exchange circuit.

9. The vehicle of claim 8, wherein the processor is configured to identify each of the power signal, the ground signal, and the LIN signal received through the first to third input pins by determining signal levels delivered to the first to third address pins of the processor.

10. The vehicle of claim 9, wherein the processor is configured to identify a pin receiving a bit from the ECU among the first to third address pins of the processor as a pin which receives the LIN signal.

11. The vehicle of claim 9, wherein the processor is configured to identify a pin in a high state among the first to third address pins of the processor as a pin which receives the power signal, and a pin in a low state among the first to third address pins of the processor as a pin which receives the ground signal, by reading the signal levels delivered to the first to third address pins of the processor.

12. The vehicle of claim 9, wherein the processor is configured to set an address of the plurality of sensors by comparing the identified each of the power signal, the ground signal, and the LIN signal received through the first to third input pins and a predetermined address designating table.

13. The vehicle of claim 8, wherein the processor is configured to set an address of the plurality of sensors based on the power signal, the ground signal, and the LIN signal delivered to the first to third address pins of the processor through the first to third input pins.

14. The vehicle of claim 8, wherein the plurality of sensors includes an ultrasonic sensor transceiving data with the ECU through LIN communication.

* * * * *